(12) United States Patent
Greenberg (10) Patent No.: US 8,131,421 B2
(45) Date of Patent: Mar. 6, 2012

(54) SYSTEM AND METHOD FOR TRACKING MEDIA

(75) Inventor: Daniel Ezra Greenberg, Stamford, CT (US)

(73) Assignee: Fujifilm Recording Media U.S.A., Inc., Bedford, MA (US)

( * ) Notice: Subject to any disclaimer, the term of this patent is extended or adjusted under 35 U.S.C. 154(b) by 953 days.

(21) Appl. No.: 12/127,039

(22) Filed: May 27, 2008

(65) Prior Publication Data

US 2008/0300786 A1 Dec. 4, 2008

Related U.S. Application Data

(60) Provisional application No. 60/940,585, filed on May 29, 2007.

(51) Int. Cl.
*G06F 7/00* (2006.01)

(52) U.S. Cl. .................................. 701/32.3; 701/400

(58) Field of Classification Search .............. 701/35–36, 701/200–202, 213–215, 1; 340/988
See application file for complete search history.

(56) References Cited

U.S. PATENT DOCUMENTS

| | | | |
|---|---|---|---|
| 4,750,197 A * | 6/1988 | Denekamp et al. | 455/404.2 |
| 4,884,208 A | 11/1989 | Marinelli et al. | |
| 5,835,377 A | 11/1998 | Bush | |
| 6,067,044 A | 5/2000 | Whelan et al. | |
| 6,201,474 B1 | 3/2001 | Brady et al. | |
| 6,243,039 B1 | 6/2001 | Elliot | |
| 6,362,778 B2 | 3/2002 | Neher | |
| 6,433,732 B1 | 8/2002 | Dutta et al. | |
| 6,472,976 B1 | 10/2002 | Wohl | |
| 6,509,867 B1 | 1/2003 | McGibney | |
| 6,510,380 B1 | 1/2003 | Curatolo et al. | |
| 6,611,757 B2 | 8/2003 | Brodie | |
| 6,788,200 B1 | 9/2004 | Jamel et al. | |
| 6,816,090 B2 | 11/2004 | Teckchandani et al. | |
| 6,819,258 B1 | 11/2004 | Brown | |
| 6,838,998 B1 | 1/2005 | Brown et al. | |

(Continued)

FOREIGN PATENT DOCUMENTS

CA 2 516 287 A1 9/2004

(Continued)

OTHER PUBLICATIONS

"Fujifilm Debuts GPS-Based Data Tape Tracker," Wireless News. Coventry: Nov. 14, 2007. p. 1.

(Continued)

*Primary Examiner* — Yonel Beaulieu
(74) *Attorney, Agent, or Firm* — Woods Oviatt Gilman LLP (57) ABSTRACT

A removable media tracking apparatus that is used to track a media case containing at least one data storage device is provided. The apparatus includes a removable media storage enclosure configured to be positioned within the media case, and a tracking device hardware positioned within the removable media storage enclosure. The tracking device hardware is operable to provide a geographical location of the media storage enclosure. A media tracking system is also provided. The system includes a media case, a plurality of media enclosures configured to be positioned within the media case, a data storage device contained in at least one of the media enclosures, a tracking device hardware contained in at least one of the media enclosures, and a tracking software program. The tracking device hardware is operable to communicate a geographical location of the media case to the tracking software program.

35 Claims, 8 Drawing Sheets

U.S. PATENT DOCUMENTS

| | | |
|---|---|---|
| 6,871,144 B1 | 3/2005 | Lee |
| 7,218,227 B2 | 5/2007 | Davis et al. |
| 2002/0006800 A1 | 1/2002 | Mohi |
| 2002/0111819 A1 | 8/2002 | Li et al. |
| 2002/0180588 A1 | 12/2002 | Erickson et al. |
| 2003/0030568 A1 | 2/2003 | Lastinger |
| 2003/0069648 A1 | 4/2003 | Douglas et al. |
| 2004/0162875 A1 | 8/2004 | Brown |
| 2005/0210131 A1 | 9/2005 | Motoyama |
| 2005/0285790 A1 | 12/2005 | Gagnon |
| 2006/0012476 A1 | 1/2006 | Markhovsky et al. |
| 2006/0080346 A1 | 4/2006 | Miller |
| 2006/0176216 A1 | 8/2006 | Hipskind |
| 2006/0200582 A1 | 9/2006 | Phipps |
| 2006/0246984 A1 | 11/2006 | Walker et al. |
| 2007/0011339 A1 | 1/2007 | Brown |
| 2007/0055686 A1 | 3/2007 | Findlay |
| 2007/0200695 A1 | 8/2007 | Almstrand et al. |
| 2007/0217501 A1 | 9/2007 | Siemens et al. |
| 2007/0229350 A1 | 10/2007 | Scalisi et al. |
| 2007/0296581 A1 | 12/2007 | Schnee et al. |

FOREIGN PATENT DOCUMENTS

| | | |
|---|---|---|
| EP | 1 225 577 A2 | 7/2002 |
| JP | 08/065413 | 3/1996 |
| JP | 2002-318127 | 10/2002 |
| KR | 20020015202 | 2/2002 |
| WO | WO 01/06507 A1 | 1/2001 |
| WO | WO 01/48505 A2 | 7/2001 |
| WO | WO 01/82259 A1 | 11/2001 |

OTHER PUBLICATIONS

"Fujifilm Unveils GPS-Based Data Tape Tracker," Business Wire. New York: Nov. 7, 2007.

"New AnyTrack GPS-100 Provides Portable, Real-Time GPS Tracking; Key Features Include Indoor/Outdoor Coverage, Affordability and Small Size," PR Newswire.New York: Mar. 20, 2007.

Smalls, Rondey, Garber, Joe, Jones, Bryon, "Location-Based Mobile Games," Clemson University.

* cited by examiner

SYSTEM AND METHOD FOR TRACKING MEDIA

CROSS-REFERENCE TO RELATED APPLICATIONS

This application claims the benefit of U.S. Provisional Patent Application No. 60/940,585, filed on May 29, 2007.

FIELD OF THE INVENTION

The present invention generally relates to a system and method for tracking the geographical location of media, such as data tapes, stored in a media case during transportation from one location to another. In particular, the present invention relates to a system including a media case configurable to hold one or more data tapes and an enclosure that houses tracking device hardware to determine and communicate the geographical location of the media case, and a secure online tracking software program that allows a user to track and manage the media cases.

BACKGROUND OF THE INVENTION

The use of computers is widespread and is playing an increasing role in society on an individual basis as well as in the business world. Computers play a vital role in most businesses in that they enable them to operate efficiently and, in some instances, provide a direct customer interface. For instance, a business may use computers for purposes of managing inventory, personnel, business financials, document generation, providing a web-based location for customers to make purchases, allowing the business to complete transitions with customers, and generally providing communication between employees of the business, for example, by e-mail.

In some instances, data that is generated by computers needs to be stored for later use or saved for recordkeeping purposes. It is not uncommon for a large amount of data to be continuously generated by a business, which results in the need to store the data at off-site vaulting locations, at alternative data storage facilities, or at disaster recovery facilities. In order to transport the data from one location to another, the data is typically saved on some form of data tape media that is easy to handle and ship, for example, a Linear Tape-Open (LTO) data tape or a Data Linear Tape (DLT) data tape.

The data contained on the data tape media is typically a valuable asset to a business in that it may contain proprietary, confidential, or other valuable records related to the business. It is therefore desirable to prevent the data from being removed from the media if the media is either lost, stolen, or the business otherwise loses control of the media. One method of securing the data contained on the media is to encrypt the media to prevent any unauthorized removal or viewing of data stored in the media. While encrypting the media may prevent the data from being removed from the media, it does not address the fact that the business has lost control of the valuable asset and will likely not be returned. Since the data tape media will not be returned, it will not be able to be reused and will need to be replaced at a cost to the business.

Therefore, there is a need for a business to be able to monitor and track the geographic location of data tape media containing such information in real-time after it leaves the business facility while being transported to off-site vaulting locations, alternative data storage facilities, or disaster recovery facilities. This will allow the business to recover the data tape media if lost or stolen during transportation from one location to another.

SUMMARY OF THE INVENTION

A removable media tracking apparatus used to track a media case containing at least one data storage device is disclosed. The removable media tracking apparatus comprises a removable media storage enclosure configured to be positioned within the media case, and a tracking device hardware positioned within the removable media storage enclosure. The tracking device hardware is operable to provide a geographical location of the media storage enclosure.

A media tracking system is also provided and includes a media case, a plurality of media enclosures configured to be positioned within the media case, at least one data storage device contained in at least one of the plurality of media enclosures, a tracking device hardware contained in at least one of the plurality of media enclosures, and a tracking software program. The tracking device hardware is operable to communicate a geographical location of the media case to said tracking software program. The system may further include a remote computing system that is adapted to operate the tracking software program to track the media case. The tracking software program may include a geo-fence program module that allows a geographic boundary to be established so that a boundary alert is generated if the tracking device hardware indicates that the media case is outside the established geographic boundary. It will be understood that the system is operable to track a plurality of media cases at the same time.

A method of tracking a media case containing at least one data storage device is also provided. The method includes placing a first media enclosure within the media case, wherein the first media enclosure includes a data storage device; placing a second media enclosure within the media case, wherein the second media enclosure includes a tracking device hardware; allowing the media case to be transported to a predetermined destination; and tracking the geographic location of the media case using the tracking device hardware during transport of the media case to the predetermined destination. The geographic location of the media case may be transmitted to a remote computing system using a wireless connection through a network. The remote computing system may include a monitor for displaying the geographical location of the media case on a map. The method also may include the step of establishing a geographic boundary, and generating an alert if the media case is positioned outside the established geographic boundary.

BRIEF DESCRIPTION OF THE DRAWINGS

The above-mentioned and other features and advantages of this invention, and the manner of attaining them, will become apparent and be better understood by reference to the following description of the aspects of the invention in conjunction with the accompanying drawings, wherein.

It will be appreciated that for purposes of clarity and where deemed appropriate, reference numerals have been repeated in the figures to indicate corresponding features, and that the various elements in the drawings have not necessarily been drawn to scale in order to better show the features.

DETAILED DESCRIPTION OF THE INVENTION

Figure 1:
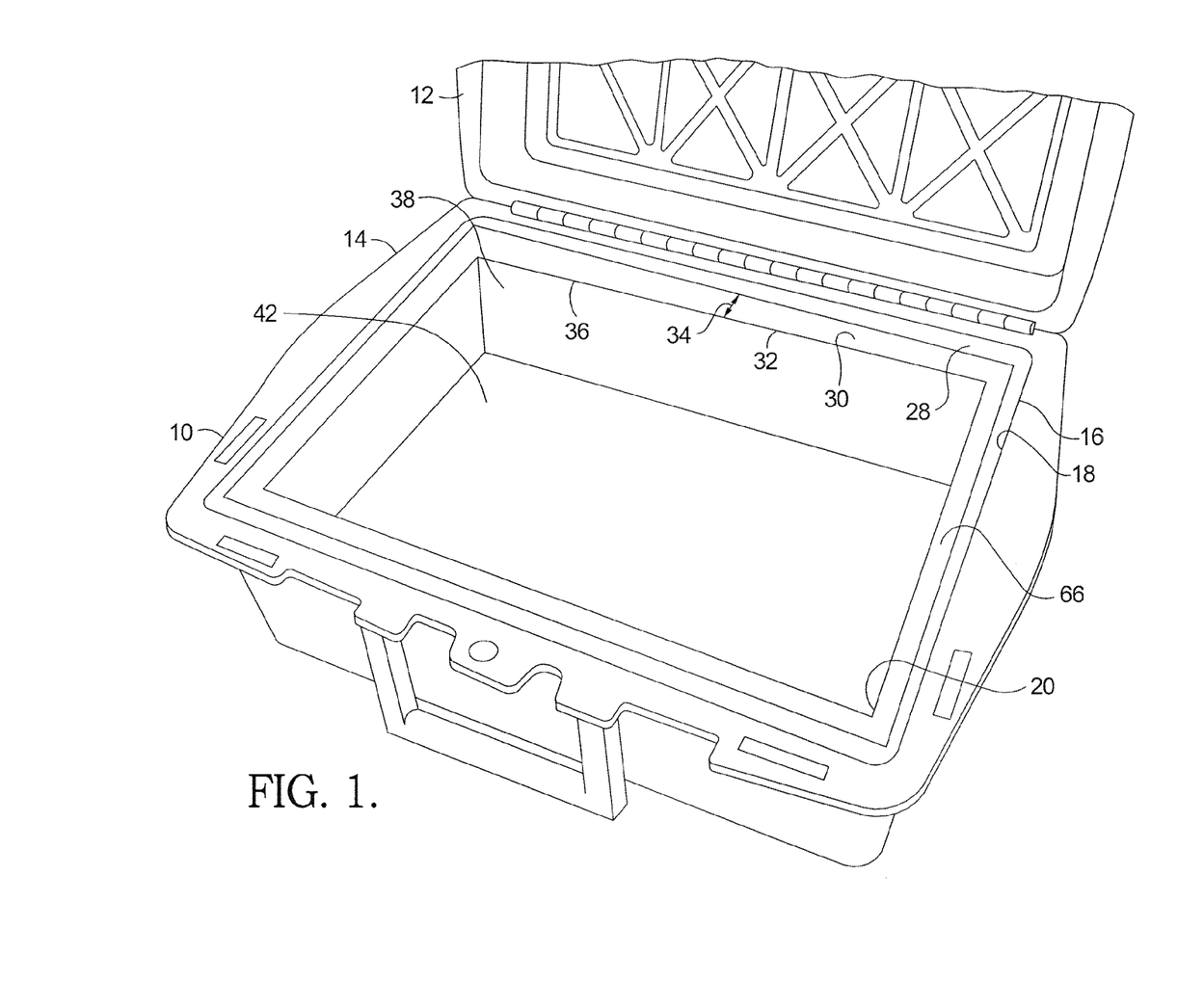
FIG. 1 is a perspective view of a media case.

Referring to the drawings in detail, and particularly FIG. 1, there is illustrated a rigid media case 10, which may include a lid 12 and a bottom portion 14 which may be hingedly connected to define an internal compartment when in a closed position. In general, the media case 10 is used to provide an enclosure for one or more media or data storage devices, such as data tapes, so that the media may be transported from one location to another. The data tapes are typically placed within a removable media storage enclosure prior to being placed within media case 10. In accordance with the present invention, a tracking device hardware, such as a GPS device or other telematic device, is also housed within media case 10 prior to transport so that the geographic position or location of the media can be tracked from a remote location using a secure online tracking software program for management purposes or in the instance that the media case is lost or stolen. The invention will be described in more detail below.

With reference to FIG. 1, the bottom portion 14 of media case 10 may include an inner periphery 16 that defines a top opening 18 of a lower compartment 20. Upper walls 22 may extend downwardly from each side of inner periphery 16 and define an upper internal surfaces. Upper internal surface 28 may terminate at a top surface 30 of a peripheral shoulder 32 defined in bottom portion 14. The top surface 30 of shoulder 32 extends inwardly defining a width 34 and an inner periphery 36. Lower walls extend downwardly from each side of inner periphery 36 of shoulder 32 define lower internal side surfaces 38 that terminate at a bottom internal surface 42 thereby defining lower compartment 20.

Figure 2:
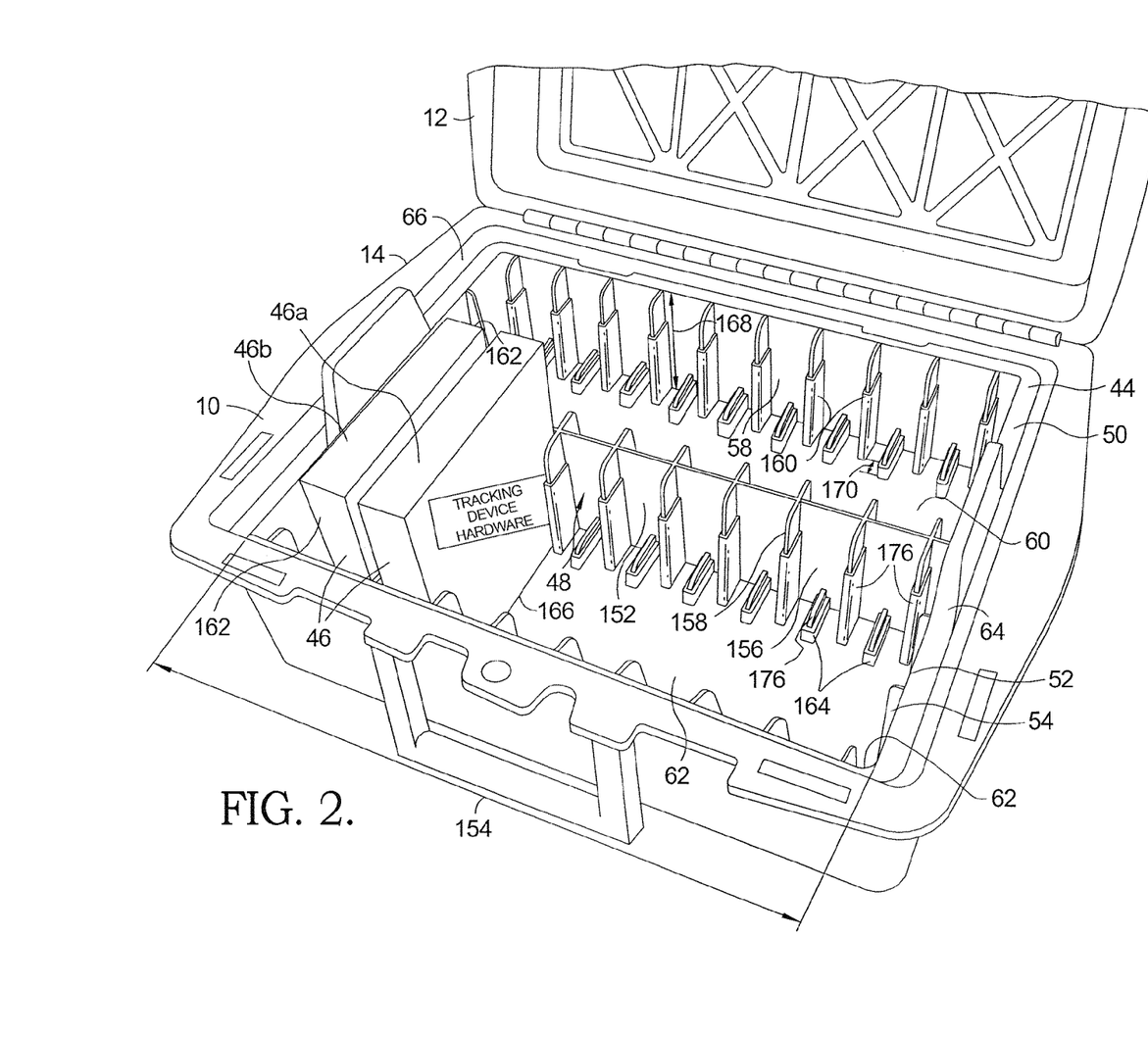
FIG. 2 is a perspective view of the media case having a media insert tray disposed therein holding a tracking device hardware enclosed within an enclosure (i.e., tracking cartridge) in accordance with an aspect of the present invention.

As best seen in FIG. 2, media case 10 may further include a media insert tray 44 disposed therein. Media insert tray 44 is configured to hold one or more removable media storage enclosures 46 that may conform to any number of standard media form factors such as, for example, Linear Tape-Open (LTO) Data Linear Tape (DLT), or Super Digital Linear Tape (SLDT), and ½" Enterprise (e.g., 3592, 2590, 3480, 9×40, T10000) for enclosing removable media. While plurality of slots 48 of media case 10 are shown to be integrally formed with media insert tray 44, it is to be understood that slots 48 may be integrally formed with media case 10 thereby eliminating the tray 44. While tray 44 is illustrated as a single piece having all features integrally formed therein, it is to be understood that tray 44 may comprise multiple removable components and component receptacles enabling tray 44 to hold multiple combinations of removable media, such as but not limited to data tapes, hard disc drives, or compact discs having different form factors such as, but not limited to, data tape form factors, for example, Linear Tape-Open (LTO), Data Linear Tape (DLT), or Super Digital Linear Tape (SLDT), ½" Enterprise (e.g., 3592, 2590, 3480, 9×40, T10000) or hard disc drive form factors, for example, 5.25 inch, 3.5 inch, 2.5 inch, 1.8 inch, and 1 inch.

Media insert tray 44 may include a peripheral flange 50 having an inner periphery 52 that defines a top opening 54 in media insert tray 44. Walls extending downwardly from each side of inner periphery 52 of flange 50 define internal side surfaces 58 that terminate at an internal bottom surface 60 thereby defining a cavity or storage area 62. Inner periphery 52 may be slightly less than inner periphery 36 of shoulder 32 enabling media insert tray 44 to be inserted downwardly into lower compartment 20 of media case 10. As media insert tray 44 is lowered into media case 10, a bottom surface 64 of flange 50 couples to a top surface 66 of shoulder 32 when media insert tray 44 is fully lowered into bottom portion 14.

As best seen in FIG. 2, a storage area 62 defined by media insert tray 44 comprises a plurality of slots 48 configurable to hold a plurality removable media storage enclosures 46. For example, FIG. 2 shows that media insert tray 44 may be configured to hold eighteen removable media storage enclosures 46. A center divider 152 traverses an internal length 154 of media insert tray 44 forming a center internal surface 156 common to each one of plurality of slots 48 defined in media insert tray 44. The plurality of slots 48 are further defined by a plurality of equally spaced inner end guides 158 that are formed with, and extend outwardly from, center divider 152. The plurality of slots 48 are further defined by a plurality of equally spaced outer end guides 160 that are formed with, and extend inwardly from, internal side surfaces 58 of media insert tray 44 and are positioned to directly oppose inner end guides 158. The inner end guides 158 and outer end guides 160 operate to capture each of an external end surface 162 of removable media storage enclosures 46 within plurality of slots 48.

As best seen in FIG. 2, spacing tabs 164 may be formed in internal bottom surface 60 of media insert tray 44. Spacing tabs 164 extend upwardly from bottom surface 60 and are centered between each of the adjacent inner end guides 158 and each of the adjacent outer end guides 160. Spacing tabs 164 are operable to provide spacing between a bottom surface 166 of each removable media storage enclosure 46 disposed in slots 48 and bottom surface 60 of media insert tray 44. Slots 48 are used to inhibit motion of removable media storage enclosures 46 during transportation of media case 10 and to provide spacing between each one of media enclosures 46 to allow for simplified removal of enclosures 46 from media insert tray 44.

Figure 4:
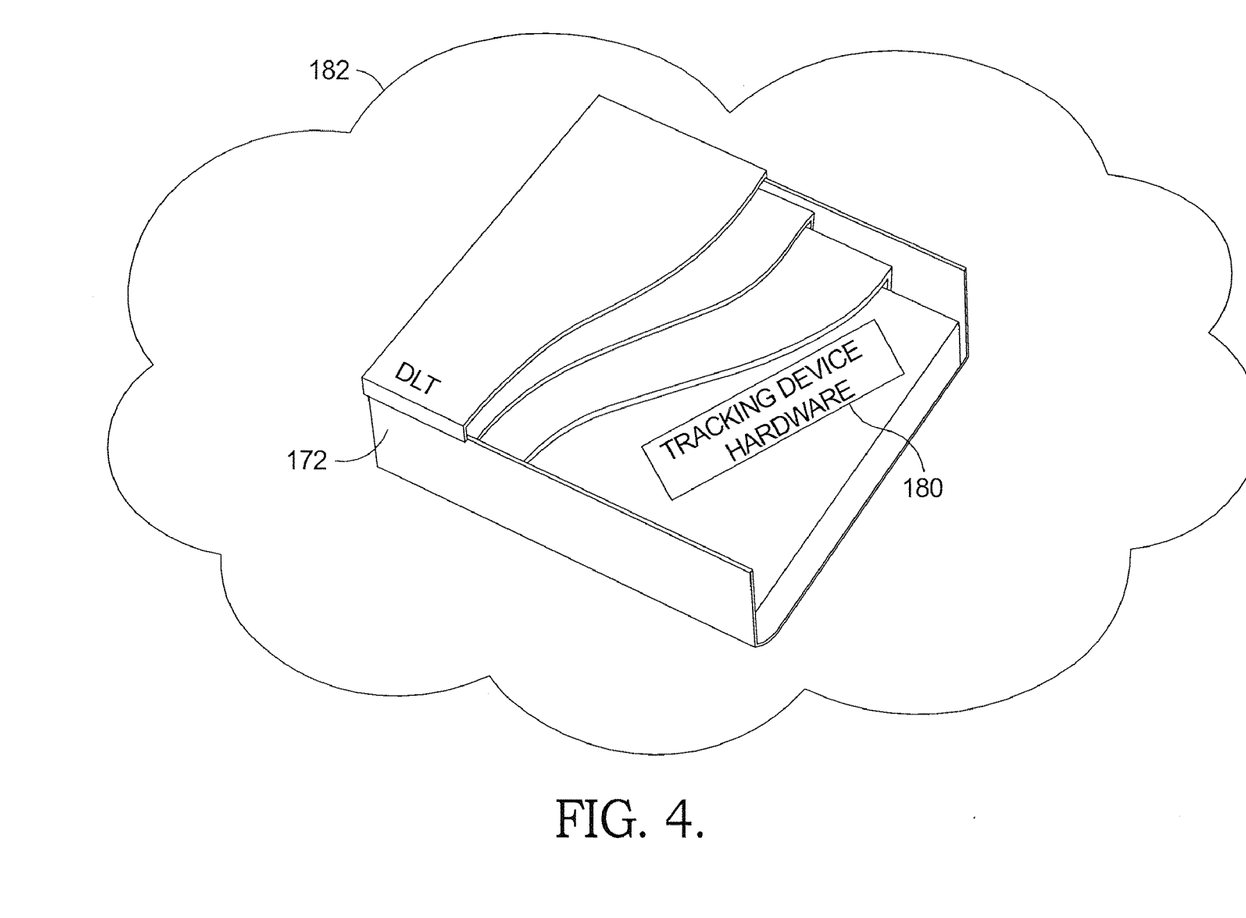
FIG. 4 is a perspective view, with portions of the outer packaging broken away, of a tracking cartridge having a different form factor compared to the tracking cartridge shown in FIG. 2.

Numerous features of media insert tray 44 including, but not limited to, lateral spacing between adjacent end guides 158,160, a depth 168 of media insert tray 44, or a height 170 of spacing tabs 164 are configurable to enable media insert tray 44 to hold plurality of removable media having different form factors. For example, Data Linear Tape (DLT) form factor data tapes 172 (FIG. 4) have dimensions larger than LTO plastic cases 150a (FIG. 2) and require more space per unit. Lateral spacing between adjacent end guides 158,160 is configurable to accommodate a plurality of DLT plastic cases 174 in a differently configured media insert tray 44. Further, some removable media for example, a hard disk drive, do not have a media enclosure 46, so slots 48 and bottom spacing components 164 may be comprised of protective foam 176.

To summarize, slots 48 may be defined in either the media case 10 or the media case insert tray 44 and are operable to store removable media storage enclosures 46 having media stored therein, and protect them during transportation. Media insert trays 44 are configurable to securely hold removable media storage enclosures 46 having various form factors. Therefore, other removable items having dimensions conforming to the form factor of removable media storage enclosures held in media case 10 can be inserted into at least one slot 48 of media insert tray 44. Alternatively, slots 48 having side surfaces and bottom spacers comprising of protective foam 176 are adaptable to protect forms of media that do not have media enclosures 46. While physical protection of media is a significant purpose of media case 10, further measures of loss prevention are desirable, such as tracking the geographic location of the media case 10 during transport from one location to another.

Figure 3:
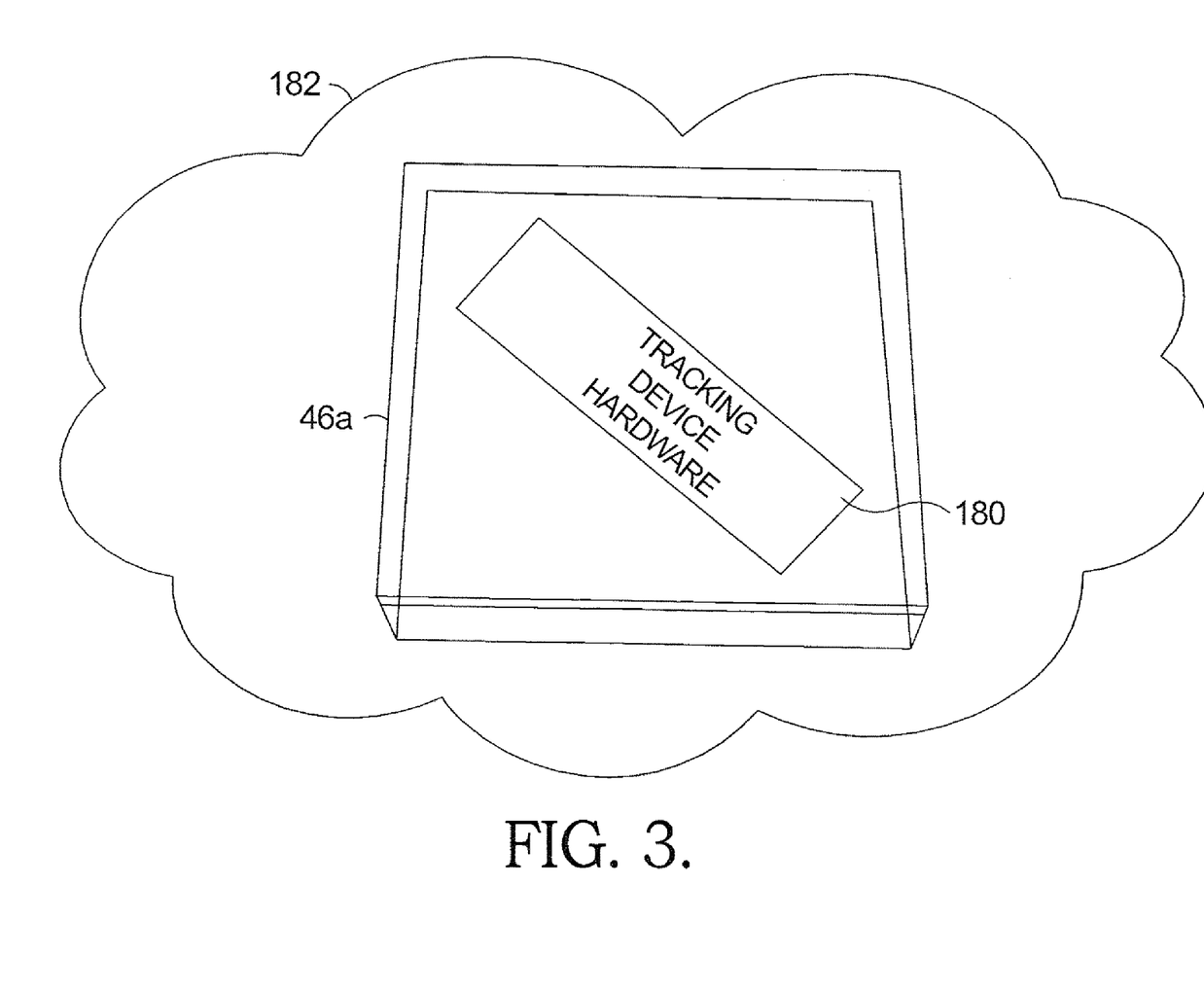
FIG. 3 is another view of the tracking cartridge shown in FIG. 2.

In accordance with one of the aspects of the present invention, with reference to FIGS. 2 and 3, one of the removable media storage enclosures 46a contained within media enclosure 10 includes a device comprising tracking device hardware 180 such as, but not limited to, a global positioning system (GPS) receiver and a data packet transmitter, while the other removable media storage enclosures 46b contained within media case 10 have data storage devices, such as data tapes, enclosed therein. The GPS receiver provided in tracking device hardware 180 is capable of determining a geographical location 182 of removable media storage enclosure 46a, and thus the media case 10. The data packet transmitter is configured to use a general packet radio service (GPRS) to transmit geographical location 182 of removable media storage enclosure 46a to a network 184, such as, for example, a data packet network or the internet, to a remote computing device so that the geographic location of media case 10 can be tracked. The outer surface of removable media storage enclosure 46a may be any color, preferably black. While FIG. 3 illustrates tracking device hardware 180 contained in removable media storage enclosure 46a, it is to be understood, and it is intended that the tracking devices may be disposed in a different sized removable media storage enclosures 46a having multiple form factors so that they may be disposed in different types of media cases 10 or media insert trays 44. For example, referring to FIG. 4, tracking device hardware 180 is shown as being disposed in a DLT form factor plastic case 172 and is also operable to function as the above LTO case 46a. In general, the tracking device hardware 180 is preferably housed within an enclosure that will fit in the same sized slots in the media case 10 that the enclosures for the removable media will fit within. Therefore, no customized slot needs to be provided for the tracking device hardware 180 within media case 10. However, it is within the scope of the present invention to provide for a custom slot for the tracking device hardware 180, if desired.

Referring now to FIGS. 2-5, a media tracking system 186 is schematically illustrated. In operation, media case 10 has media insert tray 44 disposed therein holding a plurality of media enclosures 46, wherein at least one of the media enclosures 46a contains tracking device hardware 180 and the other media enclosures 46b include removable media, such as a data tape. After the lid 12 of the media case 10 is closed, the media case 10 may be locked and shipped to an intended destination 250 (FIG. 10), such as an off-site vaulting location, alternative data storage facilities, or a disaster recovery facility. With additional reference to FIG. 11, during transportation, the geographical location 182 of media case 10 may be determined and transmitted by tracking device hardware 180 over data packet network 184, preferably the internet, to a secure online tracking software program 188 executing in a remote computing device 190 operated by a user 142. Tracking software program 188 is a set of machine executable instructions embodied on a machine readable medium for tracking and displaying the geographical location 184 of one or more media cases 10 during transportation, and monitor stationary media cases 10 to alert user 142 of any unauthorized movement of plurality of media cases 10. Further, remote computing device 190 may include a monitor 240 so that tracking software 188 may display the geographical location 184 of media case 10 on a map 242.

Figure 6:
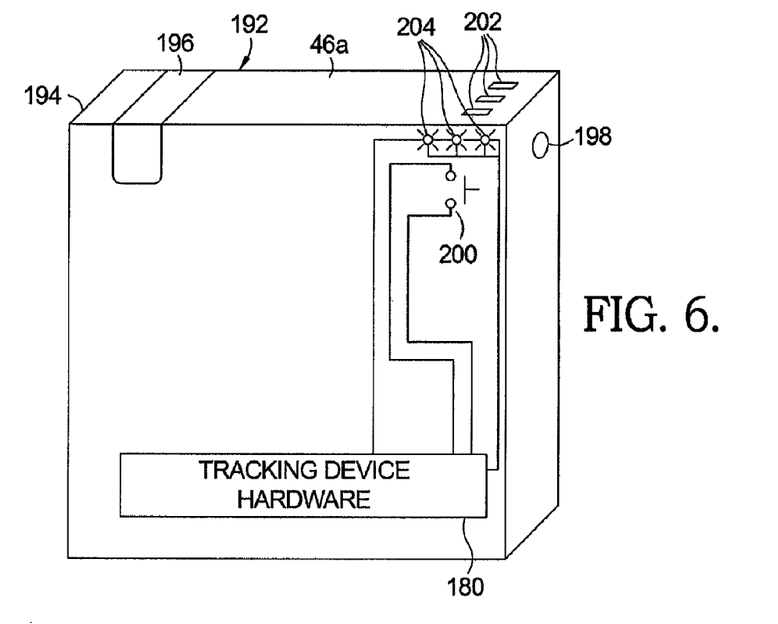
FIG. 6 is a perspective view of the tracking cartridge in accordance with a further aspect of the present invention.
Figure 7:
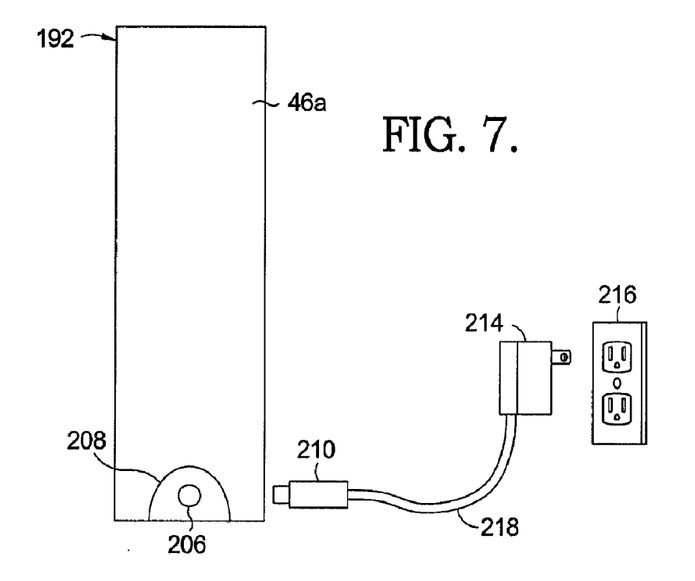
FIG. 7 is a rear view of the tracking cartridge shown in FIG. 6.
Figure 8:
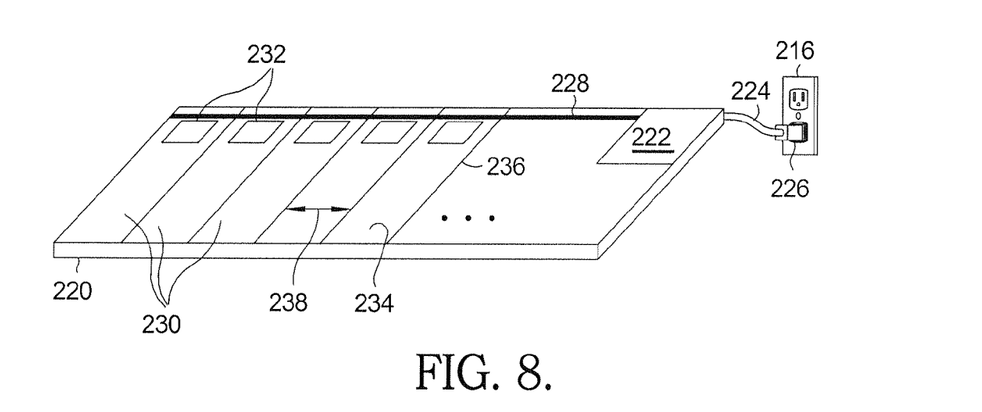
FIG. 8 is a perspective view of a recharging chassis for one or more tracking cartridges.

A further aspect of the present invention is shown in FIGS. 6 and 7. In particular, as best seen in FIG. 6, tracking device hardware 180 is shown as being located within removable media storage enclosure 46a, which may collectively be referred to as a tracking cartridge 192. Tracking cartridge 192 may be configured to have mechanical features 194 (e.g. locking device for the media enclosure) and/or labels 196 (e.g., do not open) to prevent or indicate tampering by an unauthorized user. In addition, the removable media storage enclosure 46a that houses tracking device hardware 180 may be sealed to prevent entry and access to the tracking device hardware 180. A clearance hole 198 may be defined in tracking cartridge 192 and positioned to allow insertion of an object to actuate a momentary on/off switch 200 mounted on tracking device hardware 180. Further, a plurality of clearance holes 202 may be defined in tracking cartridge 192 to allow external viewing of status indicating light emitting diodes 204 mounted on tracking device hardware 180. The status lights could indicate, for instance, on/off status, battery power level, or signal strength. As described above, tracking cartridge 192 is used in the media tracking system by insertion into media case 10 along with one or more removable media prior to transportation so that the geographical location of the media case 10 can be monitored and tracked.

As best seen in FIG. 7, a receptacle 206 disposed in an opening 208 defined in tracking cartridge 192 is configured to couple with a plug 210 of a direct current (DC) voltage source. Plug 210 may be connected to an alternating current (AC) to direct current (DC) adapter 214 using a cable 218, which then may be plugged into a standard 120 VAC outlet 216. This enables the power level of tracking cartridge 192 to be recharged before placing it in media case 10 again for further tracking of removable media contained within media case 10.

Figure 9:
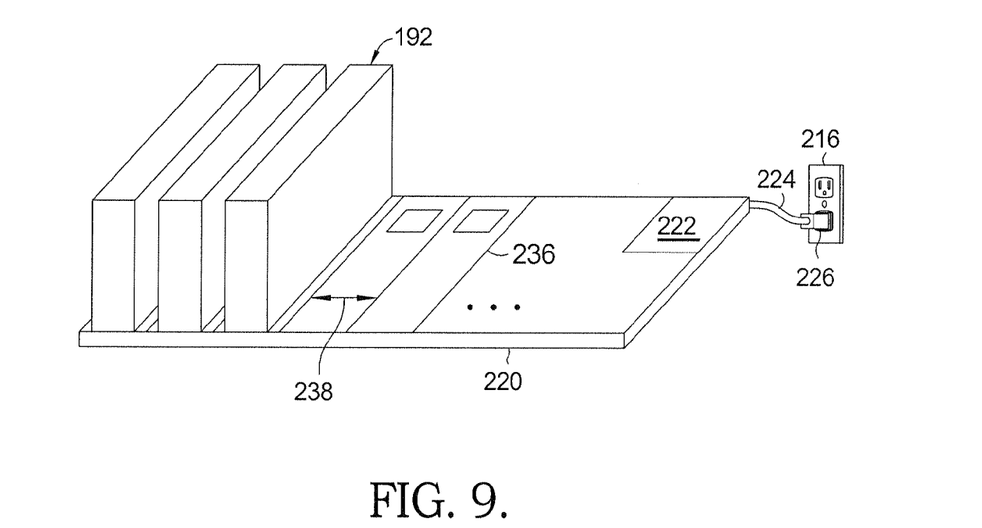
FIG. 9 is a perspective view of the recharging chassis shown in FIG. 8 that is recharging three tracking cartridges.

There may be instances that require the use of multiple tracking cartridges 192 to track multiple media cases 10 at the same time. Therefore, it may be desirable to simultaneously charge multiple tracking cartridges 192 at the same time using a recharging chassis 220. Referring now to FIGS. 6-9, recharging chassis 220 includes a power supply 222 operable to convert AC to DC. Power supply 222 is connected to a power cable 224 and a plug 226, which may plug into standard 120 VAC outlet 216 and provide power to power supply 222. Recharging chassis 220 may further comprise a power bus 228 operable to conduct DC power to a plurality of recharging slots 230 defined in recharging chassis 220. Recharging slots 230 may be configured to have a plurality of recharging slot plugs 232 positioned in a bottom surface 234 of chassis 220 such that receptacle 206 of tracking cartridge 192 mates with recharging slot plug 232 upon insertion of tracking cartridge 192 into recharging slot 230. Slots 230 may be defined by tracking cartridge guides 236 extending upwardly from bottom surface 234 of recharging chassis 220. While FIG. 9 illustrates recharging chassis 220 having a plurality of slots 230 and slot plugs 232 to recharge a plurality of tracking cartridges 192 having a common form factor, it is to be understood that a single chassis 220 may comprise slots having a combination slot widths 238, or include laterally movable tracking cartridge guides 236 operable to simultaneously recharge a plurality of tracking cartridges 192 having different form factors.

Figure 5:
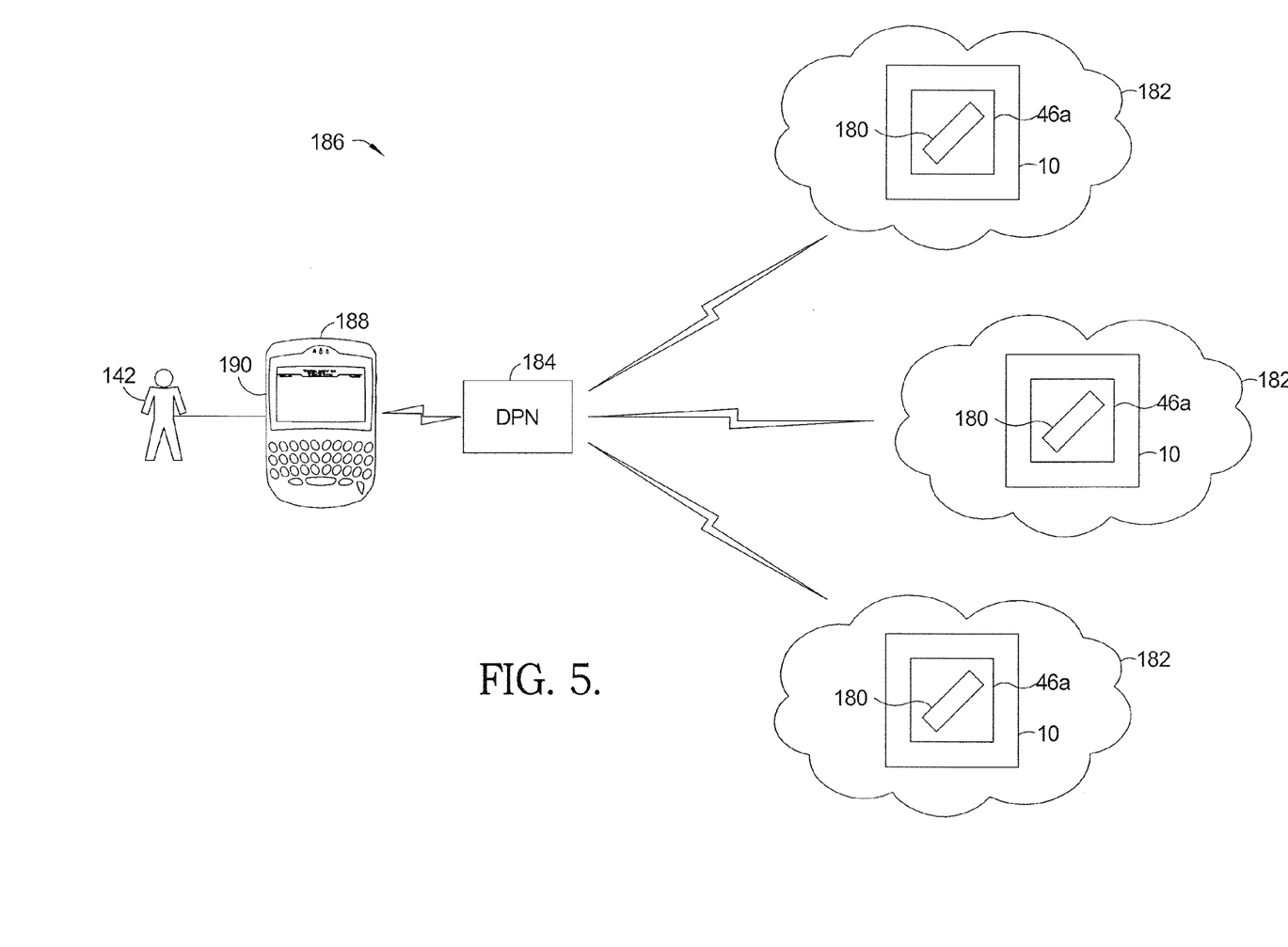
FIG. 5 is a schematic view of a media tracking system in accordance with another aspect of the present invention.
Figure 10:
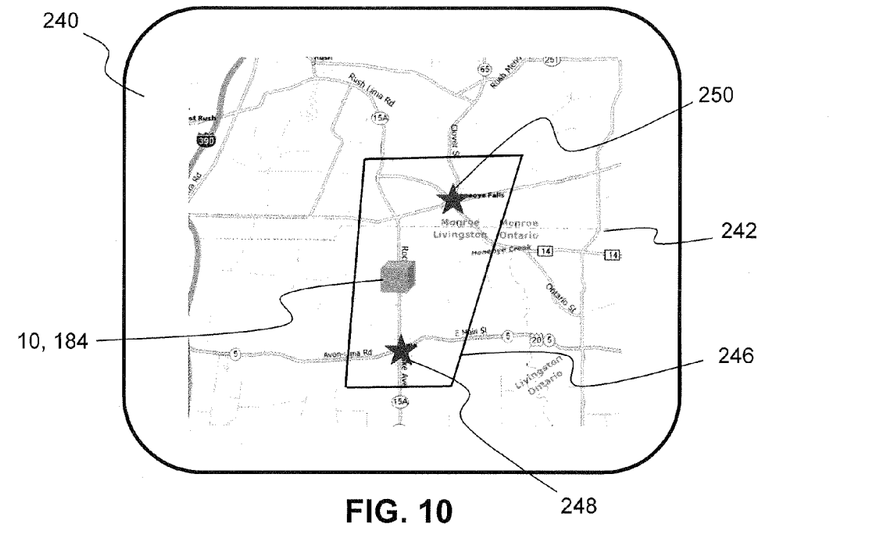
FIG. 10 is a schematic drawing of a monitor displaying a map with the geographic location of the media case thereon.
Figure 11:
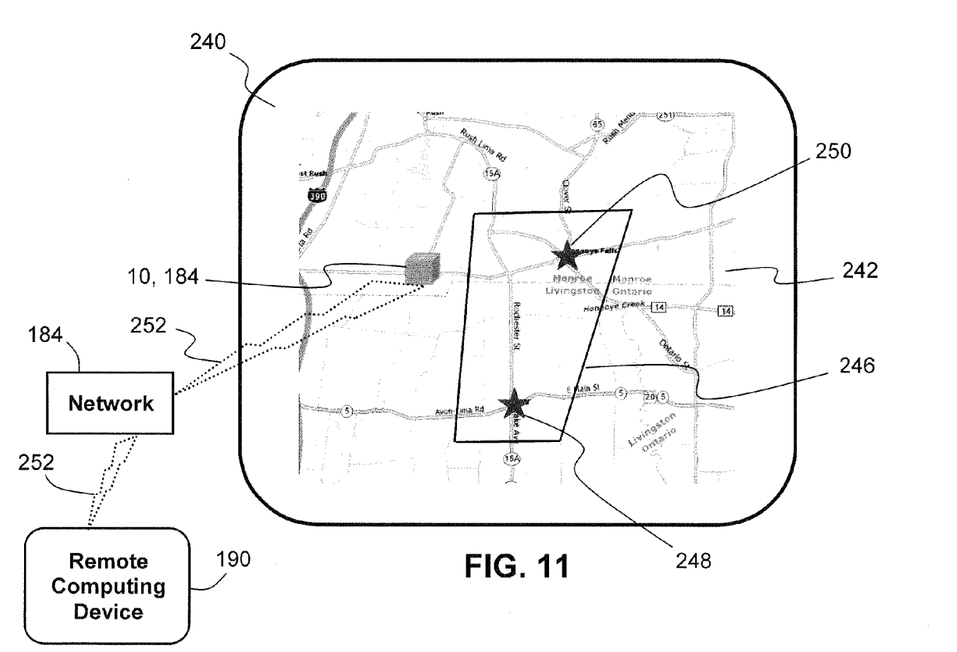
FIG. 11 is a schematic drawing showing the geographic location of the media case being outside a pre-established geographic boundary.

It also may be desirable to generate an alert if the media case 10, and removable media contained therein, are transported outside a specified geographic area. In particular, as best seen in FIGS. 5 and 10, the tracking software program 188 may include a geo-fence program module that allows for a geographic boundary 246 to be established around the media case 10 (containing tracking device hardware 180 and removable media) using a remote computing device prior to, or during, the transportation of media case 10 from one location to another. The geographic boundary 246 may be positioned around buildings, intended delivery routes, or other geographic areas. For example, the geographic boundary 246 may be positioned around both the starting location 248 and the intended destination 250 of media case 10. It will be understood that the shape of the geographic boundary 246 can take any form, such as, rectangular, oval, circular, other geometric shapes, or non-geometric shapes. If tracking device hardware 180 indicates that media case 10 has moved outside the pre-established geographic boundary 246, as best seen in FIG. 11, a boundary alert signal 252 may be generated and sent to remote computing device 190 to provide notice that the media case 10 is outside the pre-established geographic boundary 246. It will be understood that the boundary alert 252 may be visual (e-mail, text message) and/or audible, and be sent to other types of devices such as, but not limited to, telephones, cell phones, palm devices, pagers, and the like. The alert may also be generated and sent to the police or other authorities so that an immediate response be made to recover the media case 10.

By incorporating the tracking device hardware into at least one of the media enclosures (i.e., tracking cartridge) contained within the media case, numerous advantages are realized. For example, the tracking device hardware provided within media enclosure allows for the real-time tracking and monitoring of the geographic location of the media cases from their original location until they reach their intended destination. The use of the removable tracking cartridge in a media case to track its geographic location also allows a user to easily move the tracking cartridge from one media case to another without difficulty. The inherent mobility of the tracking device within media enclosure also eliminates the need to purchase separate media cases having a built-in tracking system, which may be costly. In addition, the mobility of the tracking cartridge also allows for them to be removed from the media case and recharged without difficulty.

While the invention has been described by reference to various specific aspects, it should be understood that numerous changes may be made within the spirit and scope of the inventive concepts described. Accordingly, it is intended that the invention not be limited to the described aspects, but will have full scope defined by the language of the following claims.

What is claimed is:

1. A removable media tracking apparatus used to track a media case containing at least one data storage device, said removable media tracking apparatus comprising:
    a removable media storage enclosure configured to be positioned within said media case; and
    a tracking device hardware positioned within said removable media storage enclosure,
    wherein said tracking device hardware is operable to provide a geographical location of said media storage enclosure.

2. The removable media tracking apparatus in accordance with claim 1 wherein said tracking device hardware includes a Global Positioning System receiver and a data packet transmitter.

3. The removable media tracking apparatus in accordance with claim 1 wherein said removable media storage enclosure conforms to at least one of a standard media form factor.

4. The removable media tracking apparatus in accordance with claim 3 wherein said standard media form factor includes a magnetic tape format.

5. The removable media tracking apparatus in accordance with claim 1 wherein said removable media storage enclosure is sealed from user entry.

6. The removable media tracking apparatus in accordance with claim 5 wherein said tracking device hardware further includes at least one status indicating light emitting diode visible externally to said removable media storage enclosure.

7. The removable media tracking apparatus in accordance with claim 1 wherein said removable media storage enclosure includes an aperture allowing access to a power switch mounted on said tracking device hardware.

8. The removable media tracking apparatus in accordance with claim 7 wherein said removable media storage enclosure includes a receptacle configured to mate with a plug of an external power supply and internally connect to a direct current recharging circuit disposed in said tracking device hardware.

9. The removable media tracking apparatus in accordance with claim 1 further comprising a plurality of removable media storage enclosures, wherein said tracking device hardware is positioned with one of said plurality of removable media storage enclosures, and wherein at least one data storage device is positioned within the other of said plurality of removable media storage enclosures.

10. A media tracking system comprising:
    a media case;
    a plurality of removable media storage enclosures configured to be positioned within said media case;
    at least one data storage device contained in at least one of said plurality of removable media storage enclosures;
    a tracking device hardware contained in at least one of said plurality of removable media storage enclosures; and
    a tracking software program;
    wherein said tracking device hardware is operable to communicate a geographical location of said media case to said tracking software program.

11. The media tracking system in accordance with claim 10, further comprising a remote computing system that is adapted to operate said tracking software program to track said media case.

12. The media tracking system in accordance with claim 11, wherein said remote computing system includes a monitor for displaying said geographical location of said media case on a map.

13. The media tracking system in accordance with claim 10 wherein said tracking software program includes a geo-fence program module, wherein said geo-fence program module allows for a geographic boundary to be established so that a boundary alert is generated if said tracking device hardware indicates that said media case is outside said established geographic boundary.

14. The media tracking system in accordance with claim 10 wherein said system is configured to simultaneously track a plurality of media cases.

15. The media tracking system in accordance with claim 10 wherein said media case has a lid hingedly connected to a bottom portion of said media case, wherein said bottom portion is configured to have a media insert tray positioned therein to hold said plurality of removable media storage enclosures.

16. The media tracking system in accordance with claim 15 wherein a plurality of slots are formed in said media case insert tray, wherein said slots conform to at least one of a standard media form factor.

17. The media tracking system in accordance with claim 16 wherein said standard media form factor includes a magnetic tape format.

18. The media tracking system in accordance with claim 10 wherein said plurality of removable media storage enclosures conform to at least one of a standard media form factor.

19. The media tracking system in accordance with claim 18 wherein said standard media form factor includes a magnetic tape format.

20. The media tracking system in accordance with claim 10 wherein said removable media storage enclosure that said tracking device hardware is contained in is sealed from user entry.

21. The media tracking system in accordance with claim 10 wherein said tracking device hardware further includes at least one status indicating light emitting diode visible externally to said media enclosure.

22. The media tracking system in accordance with claim 10 wherein said removable media storage enclosure that said tracking device hardware is contained in includes an aperture allowing access to a power switch mounted on said tracking device hardware.

23. The media tracking system in accordance with claim 10 wherein said removable media storage enclosure that said tracking device hardware is housed in includes a receptacle configured to mate with a plug of an external power supply and internally connect to a direct current recharging circuit disposed in said tracking device hardware.

24. The media tracking system in accordance with claim 23 wherein said external power supply comprises an alternating current to direct current adapter having an output cable including at least one of said plugs at a distal end of said cable, said plugs operable to mate with said receptacle of said media enclosures including said tracking device hardware.

25. The media tracking system in accordance with claim 23 wherein said external power supply comprises a chassis configured to have a plurality of slots, said slots each including a direct current powered plug, said plug operable to mate with said receptacle of said removable media storage enclosure including said tracking device hardware when said media enclosure is positioned in one of said slots of said chassis.

26. The media tracking system in accordance with claim 10 wherein said tracking device hardware comprises a Global Positioning System receiver and a mobile user equipment configured to wirelessly communicate said geographical location of said media case to said tracking software program through a network.

27. The media tracking system in accordance with claim 26 wherein said mobile user equipment is configured to wirelessly communicate with said network using a General Packet Radio Service.

28. The media tracking system in accordance with claim 10 wherein said tracking device hardware comprises a telematic device.

29. The media tracking system in accordance with claim 10 wherein said tracking software program is a secure internet software program.

30. A method of tracking a media case containing at least one data storage device, said method comprising:
    placing a first media enclosure within said media case, said first media enclosure including a data storage device;
    placing a second media enclosure within said media case, said second media enclosure including a tracking device hardware;
    allowing said media case to be transported to a predetermined destination; and
    tracking the geographic location of said media case using said tracking device hardware during transport of said media case to said predetermined destination.

31. The method in accordance with claim 30 wherein said geographic location is transmitted to a remote computing system.

32. The method in accordance with claim 31 wherein said geographic location is wirelessly transmitted through a network.

33. The method in accordance with claim 31 wherein said remote computing system includes a monitor for displaying said geographical location of said media case on a map.

34. The method in accordance with claim 30 wherein a power supply of said tracking device hardware is rechargeable.

35. The method in accordance with claim 30 wherein said tracking device hardware comprises a Global Positioning System receiver and mobile user equipment configured to wirelessly communicate said geographical location of said media case to a remote computing device through a network.

* * * * *